United States Patent [19]

Fuchigami et al.

[11] Patent Number: 5,510,408
[45] Date of Patent: Apr. 23, 1996

[54] METHACRYLIC RESIN COMPOSITION AND METHOD FOR PRODUCTION THEREOF

[75] Inventors: Yoshio Fuchigami, Okayama; Kouichi Warino, Ibaraki; Shigeo Matsumaru, Saitama; Yosokichi Kobayashi, Niigata, all of Japan

[73] Assignee: Kuraray Co., Ltd., Kurashiki, Japan

[21] Appl. No.: 249,431

[22] Filed: May 26, 1994

[30] Foreign Application Priority Data

May 31, 1993 [JP] Japan ................................. 5-152924

[51] Int. Cl.$^6$ ................ C08K 5/10; C08K 5/05; C08K 5/01; C08L 91/06
[52] U.S. Cl. ............... 524/317; 524/312; 524/379; 524/385; 524/487; 524/488; 524/489
[58] Field of Search ................... 524/317, 379, 524/385, 487, 488, 489, 312

[56] References Cited

U.S. PATENT DOCUMENTS

| | | | |
|---|---|---|---|
| 4,510,279 | 4/1985 | Kishimura et al. | 524/144 |
| 5,252,440 | 10/1993 | Sato et al. | 524/317 |

FOREIGN PATENT DOCUMENTS

| | | |
|---|---|---|
| 0218256 | 4/1987 | European Pat. Off. . |
| 57-123208 | 7/1982 | Japan . |
| 58-6539 | 1/1983 | Japan . |
| 1-294763 | 11/1989 | Japan . |
| 2-166148 | 6/1990 | Japan . |
| 4-53860 | 2/1992 | Japan . |

OTHER PUBLICATIONS

British Search Report dated Sep. 2, 1994 in corresponding British application No. GB 9410823.0.
Copy of Taiwanese Office Action calling attention of Japanese reference No. 2-166148 with English translation, dated Feb. 7, 1995.

*Primary Examiner*—Peter A. Szekely
*Attorney, Agent, or Firm*—Gordon W. Hueschen

[57] ABSTRACT

A composition of methacrilic resin which constitutes a resin possessing an outstandingly easy release from the mold of injection molding machine without defilement of the stamper and the peripheral ring of stamper holder, and therefore proves suitable material for replica of raser disk is provided. This methacrylic resin composition is characterized by having incorporated in a methyl methacrylate copolymer the three lubricant components, i.e. a higher alcohol (x), a monoglyceride of a higher fatty acid (y), and a paraffin (z), in such amounts that the individual contents of (x), (y), and (z) are in the respective ranges of 0.05 to 0.2% by weight, 0.05 to 0.2% by weight, and 0.02 to 0.15% by weight and the total content of (x), (y), and (z) is in the range of 0.2 to 0.35% by weight.

4 Claims, No Drawings

METHACRYLIC RESIN COMPOSITION AND METHOD FOR PRODUCTION THEREOF

BACKGROUND OF THE INVENTION

1. Field of the Invention:

This invention relates to a methacrylic resin composition and a method for the production thereof. More particularly, it relates to a methacrylic resin composition useful as a disk substrate material for such optical information memory disks as the video disk and a method for the production thereof.

2. Description of the Prior Art:

The optical video disk generally comprises a disk substrate, memory pits having about 1 μm long, about 0.4 μm wide, and about 0.1 μm deep incised in one surface of the disk substrate, an aluminum film vacuum deposited thereon so as to cover the memory pits, and a protective coating formed to cover the aluminum film. The disk substrate is produced from methacrylic resin by an injection molding device having attached to a mold thereof a stamper produced from a master disk and, therefore, is obtained in the form of a replica to which the pits have been transferred from the stamper surface. The information loaded in the pits is reproduced by a procedure which comprises projecting a laser beam on the disk substrate and reading the light reflected on the pit surfaces. The resin to be used for making the disk substrate, therefore, requires the possession particularly of such qualities as (1) excelling in the ability to permit exact transfer of memory pits during the injection molding and allow smooth release of the disk substrate from the mold (hereinafter referred to collectively as "moldability"), (2) ensuring a value of smaller optical strain (birefringence), (3) precluding the inclusion of very minute contaminants liable to interrupt the light path, and (4) excluding such chemical impurities as would entail gradual corrosion of the aluminum film among other qualities expected of the resin as a molding material.

In recent years, the growing densification of information to be stored in the disk has been growing and the need to improve the productivity, namely, to shorten the cycle of injection molding has been urging. Since the resin must be cooled at an increased speed as a result, the very minute memory pits in the stamper are required to be exactly transferred to the resin side within the mold which is kept at a lower temperature than usual heretofore. As a result the replica is released from the stamper while it has not been fully cooled and still has a plasticity to some extent. Therefore, the improvement of the "moldability" of resin is important.

In order to improve the "moldability" of the resin it is useful to improve the flowability of resin, that is, to decrease the polymerization degree or to increase the content of a co-monomer of the resin, which invariably resulting in decrease of mechanical strength and heat distortion temperature. Accordingly, in practical use the optimum condition of the resin have been selected delicatelly (JP-A-57-123,208).

The practice of using a mold release agent has been prevailing to date for the purpose of improving the release of a molded resin from the mold. For example, (1) A method which comprises using a methacrylic resin containing 0.01 to 0.1% of a hydrocarbon represented by the general formula, $C_nH_{2n+2}$ (JP-A-58-6,539), (2) A method which comprises adding 0.1 to 3.0 parts by weight of a surfactant containing a fluoroalkyl group as a lubricant to a methacrylic resin (U.S. Pat. No. 4,510,279), (3) A method which comprises adding to a methyl methacrylate polymer 0.05 to 2.0 parts by weight of at least one member selected from among fatty acid monohydric alcohols, cetanol, stearic acid glycerol esters, and perfluoroalkyl group-oleophilic group-containing oligomers (U.S. Pat. No. 5,252,440), (4) A method which comprises adding a glycerol higher fatty acid ester and a saturated aliphatic alcohol having 1 to 30 carbon atoms in a combined amount in the range of 500 to 5,000 ppm to a methyl methacrylate copolymer (JP-A-1-294,763), and (5) A method which comprises adding 500 to 5,000 ppm of glycerol higher fatty acid monoester and optionally further adding 500 to 3,000 ppm of stearyl alcohol to a methyl methacrylate copolymer (JP-A-4-53,860) have been proposed.

If the cycle of molding is shortened for the purpose of improving the productivity of the disk, however, the use of any of the methods cited above will not attain expected "moldability", resulting in lowering the yield of production. In the method cited above, the release of the replica (disk substrate) from the stamper is not sufficientlly smooth in case of lower content of lubricant. In that case the shape of replicated pit is not so perfect that the disk has some defect of signal, so-called "drop out". On the contrary in case of higher content of lubricant, condensate of volatile gas accumulate on the surface of the stamper, the mold and in the vent zone of the mold during long time operation of injection. In that case the disk has some defilement on the surface resulting in some defect of signal.

An object of this invention, therefore, is to provide a methacrylic resin composition excelling in the "moldability" and causing no defilement on the surface of the mold, and a method for the production thereof.

Another object of this invention is to provide a methacrylic resin composition capable of permitting exact transfer of memory pits and smooth mold release during the continuous formation of disk substrates by injection molding, incapable of causing defilement of the stamper, the mold, and their vicinities, and proving suitable as a molding material for disk substrates of various disks such as the laser disk and a method for the production thereof.

SUMMARY OF THE INVENTION

The objects described above are accomplished by a methacrylic resin composition which comprises a methyl methacrylate copolymer, a higher alcohol (x), a monoglyceride of a higher fatty acid (y), and a paraffin (z), providing the individual contents of x, y, and z are in the respective ranges of 0.05 to 0.2% by weight, 0.05 to 0.2% by weight, and 0.02 to 0.15% by weight and the total content of x, y, and z is in the range of 0.2 to 0.35% by weight.

These objects are also accomplished by a methacrylic resin composition which comprises a methyl methacrylate copolymer containing 87 to 95% by weight of a methyl methacrylate unit and 13 to 5% by weight of methyl acrylate unit or ethyl acrylate unit, having a monomer content of not more than 2,500 ppm, a dimer content of not more than 2,000 ppm, and an acid content of not more than 30 ppm, a higher alcohol (x), the monoglyceride of a higher fatty acid (y), and a paraffin (z), providing the individual contents of x, y, and z are in the respective ranges of 0.05 to 0.2% by weight, 0.05 to 0.2% by weight, and 0.02 to 0.15% by weight and the total content of x, y, and z is in the range of 0.2 to 0.35% by weight.

These objects are further accomplished by a method for the production of a methacrylic resin composition by continuous polymerization of a monomer mixture containing methyl methacrylate and methyl acrylate or ethyl acrylate by the use of an stirred tank reactor in the absence of a solvent, which continuous polymerization comprises (1) introducing an inert gas into the monomer mixture thereby lowering the dissolved oxygen content of the monomer mixture to below 1 ppm and then polymerizing with the aid of a radical polymerization initiator having a half-life period in the range of 0.5 to 120 seconds at the polymerization temperature while keeping the reaction solution agitated with an agitator power in the range of 0.5 to 20 kW per m³ of the reaction solution and setting an average residence time so that the ratio of the half-life period of the initiator at the polymerization temperature to the average residence time may be in the range of $1/200$ to $1/10,000$, and then setting the conversion of the monomer at a ratio in the range of 45 to 70% at a temperature in the range of 130 to 160° C., (2) cooling by the jacket of the vapor zone of the reactor, introducing an inert gas into the vapor zone of the reactor thereby entraining the monomer vapor containing relatively rich water from the reactor to lower the water content of the reaction mixture to below 1,000 ppm, then heating the resultant reaction mixture to a temperature in the range of 200° to 260° C. and supplying the heated reaction mixture to a extruder, and devolatilizing the reaction mixture thereby lowering the monomer content thereof below 2,500 ppm and the dimer content thereof below 2,000 ppm, and (3) further adding a higher alcohol (x), the monoglyceride of a higher fatty acid (y), and a paraffin (z) to a terminal part of a metering zone of the extruder in respective amounts such that, in the produced resin composition, the individual contents of x, y, and z are in the respective ranges of 0.05 to 0.2% by weight, 0.05 to 0.2% by weight, and 0.02 to 0.15% by weight and the total content of x, y, and z is in the range of 0.2 to 0.35% by weight.

The methacrylic resin composition of this invention, as described above, is characterized by acquiring outstanding "moldability" accompanied with particulary low defilement of the mold in addition to the existing characteristics such as colorlessness, transparency, thermal stability, and flowability. Thus, it permits manufacture of laser disks, for example, by a continuous injection molding process and proves ideally usable as a material such as for disk substrates of optical information memory disks.

EXPLANATION OF THE PREFERRED EMBODIMENT

Now, this invention will be described more specifically below.

The term "methyl methacrylate copolymer" as used in this invention means a copolymer which contains methyl methacrylate as a main component and a monomer copolymerizable therewith. The copolymer is used particularly preferably when the methyl methacrylate unit content thereof is not less than 80% by weight. As typical examples of the copolymerizable monomer (hereinafter referred to as "comonomer"), methyl acrylate and ethyl acrylate may be cited. The comonomer unit content in the copolymer is preferable to be in the range of 2 to 20% by weight. As the material for the molding of disk substrates of optical information memory disks, the methyl methacrylate copolymer to be used is preferable to contain 87 to 95% by weight of the methyl methacrylate unit and 13 to 5% by weight of the methyl acrylate unit or ethyl acrylate unit, preferably 90 to 92% by weight of the methyl methacrylate unit and 10 to 8% by weight of the methyl acrylate unit or ethyl acrylate unit. From the viewpoint of mechanical strength and thermal stability, the methyl methacrylate copolymer to be used is preferable to have a melt flow rate (hereinafter referred to occasionally as "MFR") in the range of 20 to 24 g/10 min.

The monomer which remains in the produced copolymer possibly causes such defects as silver streaks on the surface of products of injection molding. Thus, the content of the unreacted monomer is preferable to be not more than 2,500 ppm, preferably to be in the range of 500 to 2,000 ppm. The dimer in the produced copolymer causes the defilement of the mold in the process of injection molding and desturb the transfer of memory pits of the stamper. Thus, the content of the dimer is preferable to be not more than 2,000 ppm, preferably to be in the range of 500 to 1,500 ppm. The acid content of the copolymer can be determined by alkali-titration of a sample dissolved in chloroform. The acid content is preferable to be not more than 30 ppm, more preferably not more than 15 ppm to protect the vapor-deposited aluminum film from corrosion.

The content of micro particles having a diameter between 0.5 and 10μm can be determined by particle counter apparatus. The number of the particles in the resin composition is preferable to be set less than 15000/g.

The lubricant to be used in the resin composition is a mixture containing a higher alcohol (x), the monoglyceride of a higher fatty acid (y), and a paraffin (z). These three components of the lubricant must be added in amounts such that the individual contents of x, y, and z in the resin composition are in the respective ranges of 0.05 to 0.2% by weight, 0.05 to 0.2% by weight, and 0.02 to 0.15% by weight and the total content of x, y, and z is in the range of 0.2 to 0.35% by weight. It is essential that the lubricant should be the mixture of these three components. If the amount of any one of the three components to be added deviates from the relevant range mentioned above, "moldability" of the resin is not so good and defilement of the mold is not so rare that continuous and steady operation of injection molding cannot be attained.

The higher alcohol mentioned above is preferable to be a higher alcohol having 12 to 18 carbon atoms. The higher alcohols which are preferably usable herein include stearyl alcohol, palmityl alcohol, and mixtures thereof, for example. In the formation of disk substrate, stearyl alcohol is used particularly preferably. For the sake of this use, the steary alcohol is preferable to have a purity of not less than 90%. For methyl methacrylate copolymer resins, the higher alcohol of this quality serves as internal lubricant and an external lubricant in a good balance. Thus, the amount of this higher alcohol is preferable to be relatively large in all the amounts of the three components of the lubricant.

The monoglyceride of a higher fatty acid is preferable to be a monoglyceride having 16 to 22 carbon atoms. The monoglycerides of higher fatty acids which are preferably used herein include glycerol mono-substitution products of palmitic acid, stearic acid, oleic acid, and behenic acid and mixtures thereof, for example. In the molding of disk substrates, for example, stearic acid monoglyceride or mixtures thereof are used particularly preferably. This glyceride is used preferably when the monoester content thereof is not less than 90%. If the amount of the monoglyceride of a higher fatty acid is too small, the resin cannot be released smoothly from the surface of the gate of the mold, where the melt resin is liable to suffer extremly high shear rate and to stick to the metal surface. This trouble cannot be easily compensated by increasing the amounts of the other two components of the lubricant.

The paraffin is preferable to have a melting point in the range of 40° to 60° C. It is preferable to contain at least 80% of a paraffin having 15 to 35 carbon atoms, preferably 19 to 27 carbon atoms. As the paraffin having a melting point in the range of 40° to 60° C., any of commercially available paraffins can be used. From the viewpoint of the mold release property, the paraffin is preferable to have normal paraffin as a main component thereof. If the amount of the paraffin is too small, the resin cannot be smoothly released from the mold. Conversely, if this amount is too large, the resin tends to cause defilement of the mold.

The methacrylic resin composition of this invention can be advantageously produced by the continuous bulk polymerization method which will be described hereinbelow.

One example of the continuous bulk polymerization method will be described specifically below. First, (a) methyl methacrylate, (b) methyl acrylate or ethyl acrylate, and (c) recovered monomer are mixed with the aid of a flow rate controller so as to produce a mixed solution having a prescribed composition. Then, by continuously adding 0.2 to 0.4% of a chain transfer agent to the produced mixed solution (d) by means of a metering pump, a feed monomer solution is continuously prepared automatically. Nitrogen gas was mixed continuously to the monomer solution at a ratio of more than two times to the rate of the feed liquid by actual volume. The mixture was led to a reservoir tank kept cooled below 20° C., where the oxygen entrained by nitrogen gas was separated from the resulting monomer solution containing less than 1 ppm of dissolved oxygen. If the dissolved oxygen content in the prepared monomer solution exceeds 1 ppm, the excess dissolved oxygen affects the rate of polymerization and prevents the constant proceeding of polymerization. The prepared monomer solution is cooled to a fixed temperature below 5° C. in a cooler and then continuously fed by a pump to the reactor.

As typical examples of the chain transfer agent which is advantageously used herein, such mercaptans as n-butyl mercaptan, n-octyl mercaptan, and n-dodecyl mercaptan may be cited.

In the meantime, the polymerization initiator is dissolved in the monomer containing not less than 50 ppm of dissolved oxygen to give rise to a monomer solution of a concentration of 0.5 to 5%, which is continuously added by a metering pump to the monomer solution mentioned above. The feed monomer solution to which the initiator has been added is passed through a filter of a mesh size of not more than 0.5 μm and then continuously supplied to the reactor.

The polymerization initiator is a radical initiator having a half-life period in the range of 0.5 to 120 seconds, preferably 1 to 60 seconds, at the polymerization temperature. The radical initiators which are advantageously usable herein include such azo compounds as 2,2-azo-bis-isobutyronitrile, 2,2-azo-bis(2,4-dimethyl valeronitrile), and 2,2-azo-bis(2-methyl butyronitrile) and such organic peroxides as 1,1-bis(t-butyl peroxy)3,3,5-trimethyl cyclohexane, t-butyl peroxy-butyrate, benzoyl peroxide, and lauroyl peroxide, for example. The use of the initiator having such a short life as mentioned above brings about such advantages as to proceed the polymerization reaction at an extremely constant conversion, and to be kept the conversion constant even when the feed of the monomer solution to and the discharge of the polymer solution from the reactor are temporarily suspended on account of a trouble occurring in a process other than the polymerization process. As a result the phenomenon of run away of the polymerization reaction is removed during the suspended period mentioned above. If the initiator to be used has a half-life period of more than 120 seconds at the polymerization temperature, the advantages enumerated above are no longer obtained. Conversely, if the initiator has a half-life period of less than 0.5 second, the disadvantage will occur that the amount of this initiator must be too large.

In the polymerization reactor, the reaction temperature is set in the range of 130° to 160° C. so as to get the conversion in the range of 40 to 70%. If the reaction temperature exceeds 160° C., such high-boiling impurities as dimer and trimer will increase. Conversely, if this reaction temperature is lower than 130° C. the viscosity of the reaction mixture will increase and the polymer-block will grow up on the wall of the reactor in vapor zone and the shafts of the agitator to the extent of preventing the reactor from stable operation. If the ratio of the monomer conversion falls below 40%, the load of devolatilization and monomer recovery will be increase.

The residence time of reaction (i.e. the rate of volume of reaction solution/the flow rate of feed =θ) may be selected in the range of 1 to 6 hours, providing the ratio of the reaction residence time to the half-life period ($\tau_{1/2}$) at the reaction temperature of the initiator being used ($\tau_{1/2}/\theta$) falls in the range of 1/200 to 1/10,000, preferably 1/200 to 1/2,800.

The agitator power must be set at a level in the range of 0.5 to 20 kW per $m^3$ of the reaction mixture. If the agitator power is less than 0.5 kW, the amount of the initiator to be added must be increased. If the motive power exceeds 20 kW, the consumption of power will increase.

The reaction pressure is preferably increased by the addition of an inert gas so as to surpass the vapor pressure of the monomer at the reaction temperature. The inert gas is preferably introduced from directly below the mechanical seal device of the agitator, it brings about the advantage of preventing possible formation of a polymer-block in the sealing device. This inert gas is discharged from the upper part of the reactor, passed through a condenser, and a pressure control valve. The pressure may be selected in the range of 2.5 to 6 kg/$cm^2$G. The vapor zone of the reactor and the pipe between the reactor and condenser are preferable to be water cooled by means of a jacket. Owing to this water cooling, the problem of generation of the polymer-block to the inside wall of the vapor zone of the reactor is eliminated and the reactor can be operated stably.

The monomer vapor to be entrained by the inert gas is condensed by a condenser which is kept cooled with brine and the resultant condensate is discharged from the system. Since this vapor includes a gas-liquid equilibrium with the polymerization reaction solution and water and the monomer forms a minimum azeotrope, the content of water in resultant condensate mentioned above is enriched. The water brought into the system accompanying by the feed monomer can be effectively removed therefrom. This fact avoids previous dehydration of the feed system by adsorption and so on. The concentration of water in the reaction solution is determined by the amount of the condensate to be discharged. So the content of water in the reaction solution is controlled by the flow rate of the purge nitrogen. The flow rate of the purge nitrogen is preferable to be 5 to 20 times the flow rate of the monomer solution being fed to the reactor. The amount of the condensate to be discharged is negligible about 0.1%, based on the amount of the product.

The concentration of water in the condensate is in the range of 0.5 to 1% and the content of water in the polymerization reaction solution is controlled in the range of 300 to 1,000 ppm.

The process of devolatilization serves the purpose of separating the monomer from the polymerization reaction solution to get product of polymer. Specifically, it comprises discharging the reaction solution via the drain valve of the reactor by means of a gear pump, heating the extracted reaction solution with a heat exchanger, and flushing the hot reaction solution through a needle valve into the devolatilization device thereby gasifying the monomer and isolating the polymer. The temperature of the heat exchanger may be selected in the range of 200° to 260° C. and the pressure in the range of 20 to 30 kg/cm$^2$G. In this case, the pressure in the heat exchanger must be increased to such an extent that vaporization of the monomer is impossible, because vaporization of the monomer in the heat exchanger results in decrease of efficiency of heat exchange. If the heating temperature is too high, the formation of a dimer in the heat exchanger is accellated. If this temperature is too low, the efficiency of devolatilization is decreased. When a shell-and-tube heat exchanger having a static mixer inserted therein is used, it exhibits a heat-transfer coefficient two to three times as high as that of an empty pipe and, therefore, reduce the scale of the heat exchanger. Since the residence time in the heat exchanger is shortened proportionately to the scals, the use of this particular heat exchanger produces the advantage of decreasing the amount of the dimer to be formed inside the heating device.

A vessel or a extruder can be used as the deaeration device. The vessel, however, is not favorably used for the production of a molding material for laser disks because part of the resin flushed into the tank sticks to the wall of the tank and possibly causes inclusion of the impurity of micro particles in the product. The method which proceeds the devolatilization by flushing the feed monomer solution into an extruder, eliminating the greater part of the monomer vapor from the extruder via a vent arranged backward (back vent) relative to the direction of resin extrusion, and releasing the residual monomer vapor via a vacuum vent arranged forward (front vent) has the advantage of avoiding the problem mentioned above. At this time, the cylinder temperature is selected in the range of 180° to 260° C. and the vacuum degree of the front vent in the range of 10 to 40 mmHg.

The monomer vapor eliminated via the back vent mentioned above is fed to the distillation column to be cut of high-boiling impurities therein and then recycled as the recovered monomer. To this distillation column, a very minute amount of air is introduced via the bottom thereof and used for the purpose of prevent formation of a polymer in the column. The recovered monomer tank may be filled with an atmosphere of air and kept cooled to below 20° C. for the sake of ensuring stability of the monomer contained therein.

The three-component lubricant mentioned above is melted in a tank which is kept heated at a temperature in the range of 80° to 120° C., forced into the terminal part of the metering zone of the extruder by means of a metering pump both of which are both kept at the same temperature as mentioned above, and mixed into the resin by means of a screw of the extruder. Preferably, the resultant mixture is further agitated with a static mixer.

Now, the present invention will be described more specifically below with reference to working examples, which are meant to be illustrative of and not limitative in any respect of this invention. The physical properties which will be mentioned in the working examples were determined as follows.

(1) Determination of MFR

The MFR was determined by extruding a sample through a melt indexer (produced by Takara Thermistor Instruments Co., Ltd.) under such conditions as a temperature of 230° C., a load of 3.8 kg, an extrusion distance (L) of 2.54 cm, a cylinder diameter (D) of 5.08 cm, and a die nozzle diameter of 0.2095 cm in accordance with ASTM-1238, measuring the extrusion time (t) in seconds, and performing a calculation on the following formula 1:

$$MFR=(\pi/4)D^2L\times(\text{specific gravity})\times 600/t \quad (1)$$

(2) Determination of average molecular weight by the intrinsic viscosity method

The average molecular weight M was determined by taking 0.6 g of a sample, dissolving this sample in 25 ml of chloroform, measuring the viscosity of the resultant solution at 20° C. by the use of a Ubbelohd's viscometer, diluting the solution to varying volumes of 2 to 6 times the original volume, measuring the viscosities of the diluted solutions, calculating the limiting viscosity [η] at an infinite dilution by extrapolation based on the numerical values of the viscosities mentioned above, and performing a calculation on the following formula 2 which was established by G. Meyerhoff and G. Schulz as reported in Macromol. Chem., Vol. 7, 294 (1951).

$$[\eta]=4.85\times 10^{-5}\times M^{0.8} \quad (2)$$

(3) Analysis of impurities and lubricant

This analysis was performed by weighing out accurately 2 g of a sample, dissolving the sample in 10 ml of chloroform containing dimethyl phthalate (internal standard) at a concentration of 1 g/100 ml, adding 30 ml of hexane into the solution to separate a polymer as a precipitate, injecting 2 μl of the supernatant into a gas chromatograph (produced by Shimadzu Seisakusho Ltd.), and operating the gas chromatograph under the following conditions.

Column: Capillary column G-230, 1.2 mm diam.×40 m

Column temperature: Kept at 50° C. for 4 minutes and elevated from 50° to 270° C. at a rate of 15° C. /min.

Injection temperature: 250° C.

Detector temperature: 270° C.

(4) Determination of acid content

The acid content of a sample was determined by taking 5 g of a sample, dissolving the sample in 50 ml of chloroform, and titrating the resultant solution with a N/100 alcoholic KOH solution using bromothymol blue as an indicator.

(5) Evaluation of micro particles

This evaluation was performed by dissolving 6 g of a sample in 1000 g of acetone and subjecting the resultant solution to observation under an automatic particle counter, HIAC-ROYCO Model 346 to take count of particles measuring 0.5 to 10 μm in diameter.

(6) Evaluation of "moldability"

An injection molding machine (produced by Meiki Co., Ltd. and marketed under trademark designation of "Dynameltor M-200-DM" ) which was fitted with a mold of video disk (produced by Crown Industry Ltd.) designed 300 mm in diameter and 1.2 mm in thickness was operated to mold 2,000 sheets of disk substrate contineously under the following conditions and a robot was used to release the replicated disk substrate automatically from the mold. The "moldability" of the resin was evaluated by the number of occasions on which the release of molded disk substrates by the robot was interrupted on account of inferior release from the stamper, from the sprue part, or the gate part, for example. The results of this evaluation were rated on the four-point scale, wherein rank A stands for 0, rank B for 1 to 5, rank C for 6 to 10, and rank D for 11 or more respectively as the number of such interruptions.

Cylinder temperature: 270° C. (nozzle side), 250° C. (middle part), 230° C. (hopper side)

Nozzle temperature: 280° C.

Mold temperature: 50° C.

Injection pressure: 1,000 kg/cm$^2$

Injection ratio: 200 cc/sec.

Molding cycle: 12 sec. (including a cooling time of 6 sec.)

(7) Evaluation of defilement of mold

This evaluation was performed by the visual observation of the extent of defilement found on the stamper holder and the peripheral ring (gas vent) after molding of a total of 2,000 disks by the injection molding. The results of this evaluation were rated on the five-point scale, wherein rank A stands for virtually no defilement found on the mold except for slight haze found in an extremely limited part, rank B for slight haze found substantially throughout the entire periphery of the gas vent part of the mold, rank C for haze found throughout the entire periphery and slight liquid condensate, rank D for liquid condensate throughout the entire periphery, and rank E for heavy liquid condensate and trickle of the liquid condensate to the stamper surface.

(8) Evaluation of durability of the laser disk (namely durability of vapor-deposited aluminum film).

The evaluation was performed by a total hour before appearance of a defect of a picture on the TV screen after exposition of a laser disk in an atmosphere of relative humidity of 95% at 55° C.

EXAMPLE 1

Methyl methacrylate, ethyl acrylate (hereinafter referred to briefly as "EA"), and recovered monomer were automatically metered out continuously at respective rates of 19.8 kg/h, 1.52 kg/h, and 14 kg/h with a micro-motion flow rator (produced by Oval Corp.), then n-octyl mercaptan metered out similarly at a rate of 0.112 kg/h with a metering pump (produced by Miltonroy Co. and marketed under product code of "396-31") was added to the monomers. Nitrogen gas was added to the monomer solution at a rate of 150 liters/h in front of a static mixer (12 elements) (produced by Noritake Co.) and received into a reservoir tank kept cooled at 15° C. The resultant mixture was analyzed with a dissolved oxygen meter (produced by Central Kagaku K. K. and marketed under product code of "UC-12-SOL") to be found to contain dissolved oxygen at a concentration below the detective limit (0.6 ppm). The liquid mixture was fed at a rate of 35.37 kg/h by a metering pump into the reactor via a cooler and a 0.2 μm-mesh size filter.

On the other hand, 0.5% by weight of 2,2-azo-bisisobutyronitrile was dissolved in the monomer containing the dissolved oxygen at a concentration of 70 ppm in a preparation tank kept cooled to 3° C. The resultant solution was fed at a flow rate of 0.726 kg/h by a metering pump to the upstream of the filter above mentioned.

To the vapor zone of the reactor, a condenser having a heat transfer area of 1 m$^2$ and cooled with brine was connected. An 200-liters stirred tank reactor made of SUS316 was filed with 108 kg of reaction solution. In this case the residence time of the reaction was 3.0 hours and the half-life period of the initiator was 3.6 seconds, it follows that the ratio of the half-life period of the initiator to the residence time ($\tau_{1/2}/\theta$) was 1/3000.

A condenser having a heat transfer area of 1 m$^2$ and cooled by brine was equipped to the vapour zone of the reactor. The reaction temperature was controlled at 150° C. by cooling the jacket of liquid zone of the reactor with thermo-oil and also the jacket of vapor zone of the reactor with water. A double mechanical seal was adopted for sealing the shaft of the agitator. A 0.3 Nm$^3$/h of nitrogen was led into directly below the seal box, passed through the condenser and released from a pressure control valve controlling the pressure of vapor zone of the reactor at 3.0 ' kg/cm$^2$G. The rate of discharged condensate of the condenser was 0.02 kg/h and the content of water was analysed to be 0.65%. Max blend vanes agitator (produced by Sumitomo Shipbuilding and Machinery Co., Ltd.) was used to agitate the contents of the reactor at a rate of 200 rpm. The power consumption for the agitation was calculated by deducting the no-load power from the value of the dynamometer of the agitator motor was 2.2 kW/m$^3$. The reaction solution in the reactor was discharged via the drain valve thereof by a gear pump at a rate such as to keep the liquid level in the reactor constant. The reaction solution was passed through the heater and fed via the needle valve to the extruder.

A shell-and-tube type of heat exchanger having a static mixser (produced by Noritake Co., Limited and marketed under product code of N-10) inserted within was used as the heater. The temperature of the reaction solution was raised to 235° C. by the thermo-oil in the shell of the heat exchanger. The internal pressure of the heater was adjusted to 24 kg/cm$^2$. G by means of a needle valve at the outlet of the heater.

A uniaxial screw extruder provided with a back vent and a front vent and measuring 65 mm across and 2.08 m long was used for devolatilization. The needle valve mentioned above was directly connected to the cylinder of the extruder and the reaction solution in the heated and pressed state was flushed onto the screw kept rotating at 50 rpm. Most of the monomer vapor was eliminated via the back vent. The residual polymer was pressed by the compression and the metering zone of the screw and flushed into the front vent evacuated to 15 mmHg with a vacuum pump to be vacuum devolatilized therein. The resultant polymer was pressed to 95 kg/cm$^2$.G in the terminal compression and the metering zone of the extruder, passed through a breaker plate fitted with a metallic net of 400 mesh and a static mixer (6 elements), extruded through a die in the form of strands, cooled in a water tank, drawn with a cutter, chopped into pellets, and classified with a sifter. The temperature of the cylinder was fixed at 210° C. in the back vent zone, 260° C. in the zone from the feed part to the front vent, and 200° C. in the terminal compression and the metering zone.

The monomer vapor eliminated through the back vent was fed to the lower part of the distillation column having 6 perforated trays. A high boiling mixture composed of approximately 60% of monomer and 40% of high boiling component comprised of n-octyl mercaptane, dimer and trimer was drained away from the bottom of the column and a purified monomer was recovered from the top of the column. Air was introduced at a flow rate of 1.5 liters/hr into the column via the bottom thereof and released therefrom via the condenser. The recovered monomer was stored in a tank provided with a water-cooling jacket, purged of the entrained air.

Stearyl alcohol having a C$_{18}$ content of not less than 95% (produced by Kao Co., Ltd. and marketed under trademark designation of "Calcohol 80), monoglyceride of stearic acid having a monoester content of not less than 93% (produced by Kao Co., Ltd. and marketed under trademark designation of "Excel T-95"), and paraffin, mainly composed of n-paraffin, having a melting point of 42° to 44° C. (produced by Wako Pure Chemical Industries Ltd. and marketed under product code of "SP-0110C") were mixed at a weight ratio of 1: 1: 0.5 and melted in a tank. The mixture was added at a flow rate of 54.1 g/hr into the metering part in the terminal zone of the extruder with a metering pump (produced by Miltonroy Company and marketed under product code of "EXP-2396-31"). The lubricant was mixed with the molten polymer by the screw of the metering part and the static mixer. In the resultant resin composition, the lubricant was contained uniformly at a concentration in the range of 0.24 to 0.26% by weight.

In an operation continued for 30 days, the yield was found to be constant in the range of 21.5 to 21.8 kg/h (monomer conversion 59.5 to 60.5). The pellets were found to have a MFR of 21.5. When these pellets were analyzed by gas chromatography, they were found to contain EA at a concentration of 7.0% by weight and the residual monomer, dimer, and trimer at respective concentrations of 0.08, 0.08, and 0.07% by weight. The acid content of the pellets was found to be 7 ppm per g of the polymer. By analysis with GPC-LALLS, the polymer was found to have a number average molecular weight (Mn) of 48,600, a weight average molecular weight (Mw) of 75,300, and a molecular weight distribution (Mw/Mn) of 1.6. The average molecular weight of the polymer determined by the intrinsic viscosity method was found to be 84,000. The number of micro particles 0.5 to 10 μm in diameter measured by a particle counter was found to be 12,600 per g of the polymer. The pellets were found to contain stearyl alcohol, monoglyceride of stearic acid, and paraffin, at respective concentrations of 0.1% by weight, 0.1% by weight, and 0.05% by weight.

From the pellets, 2,000 sheets of disk substrates for laser disks were continuously molded by injection molding. The replicated disk substrates were tested for "moldability" and the difilement stamper and the results are invariably rated as rank A. The produced laser disks were found to have highly satisfactory durability of 336 hours. Examples 2 to 4 and Controls 1 to 7

The procedure of Example 1 was repeated while using the same three lubricant components as in Example 1 and varying the amounts of these components. The results were as shown in Table 1. The products of Examples 2 to 4 invariably showed as high durability as was obtained by the product of Example 1.

TABLE 1

| | lubricant (% by weight) | | | moldability | | | defilement |
|---|---|---|---|---|---|---|---|
| | stearyl alcohol | stearic acid monoglyceride | paraffin | stamper | sprue | gate | of mold |
| Example 2 | 0.15 | 0.1 | 0.05 | A | A | A | A |
| Example 3 | 0.1 | 0.15 | 0.05 | A | A | A | A |
| Example 4 | 0.1 | 0.1 | 0.1 | A | A | A | A |
| Countrol 1 | 0.15 | 0.1 | 0 | A | B | B | C |
| Countrol 2 | 0.15 | 0 | 0.1 | A | B | B | E |
| Countrol 3 | 0 | 0.2 | 0.05 | A | C | C | B |
| Countrol 4 | 0.25 | 0 | 0 | A | B | B | E |
| Countrol 5 | 0 | 0.3 | 0 | A | C | D | A |
| Countrol 6 | 0 | 0 | 0.25 | B | D | C | E |
| Countrol 7 | 0.15 | 0.15 | 0.1 | A | A | A | E |

EXAMPLES 5 to 7

The procedure of Example 1 was repeated while varying the kinds of the three lubricant components. The results were as shown in Table 2. The products of Examples 5 to 7 invariably showed as high durability as was obtained by the product of Example 1.

TABLE 2

| | Kind and amount of lubricant (% by weight) | | | moldability | | | defilement |
|---|---|---|---|---|---|---|---|
| Example | higher alcohol | monoglyceride of higher alcohol | paraffin | stamper | sprue | gate | of mold |
| 5 | cetyl alcohol 0.1% | stearic acid monoglyceride 0.1% | mp. 42–44° C. of paraffin 0.05% | A | A | A | A |
| 6 | cetyl alcohol 0.1% | oleic acid monoglyceride 0.1% | mp. 48–50° C. of paraffin 0.05% | A | A | A | A |
| 7 | cetyl alcohol 0.1% | oleic acid monoglyceride 0.1% | mp. 58–60° C. of paraffin 0.05% | A | A | A | A |

EXAMPLE 8

Pellets were produced by repeating the procedure of Example 1 while feeding methyl methacrylate, ethyl acrylate, and recovered monomer at respective flow volumes of 19.8 kg/h, 2.08 kg/h, and 14 kg/h, controlling the reaction temperature in the reactor at 140° C., and adjusting the residence time in the reactor at 2.5 hours. The pellets thus obtained were found to have a MFR of 21.7. These pellets were found to contain EA at a concentration of 8.0% by weight and the residual monomer, dimer, and trimer at respective concentrations of 0.11, 0.05, and 0.07% by weight. They were found to contain stearyl alcohol, monoglyceride of stearic acid, and paraffin, the three lubricant components, at respective concentrations of 0.1% by weight, 0.1% by weight, and 0.05% by weight.

From these pellets, disk substrates for laser disks are molded continuously by injection molding. The disk substrates were tested for "moldability" and defilement stamper in the same way as in Example 1. The results were invariably rated as rank A. They showed as high durability as those of Example 1.

EXAMPLE 9

Pellets were produced by repeating the procedure of Example 8 while using the same three lubricant components as used in Example 2. When the disk substrates for laser disks similarly obtained from the pellets were tested for moldability and defilement of stamper. The results were invariably rated as rank A. The disk substrates showed as high durability as those of Example 1.

The pellets used for the disk substrates as described above were found to contain stearyl alcohol, monoglyceride of stearic acid, and paraffin, the three lubricant components, at respective concentrations of 0.15% by weight, 0.1% by weight, and 0.05% by weight. Examples 10 to 12 and Controls 8 to 10

The procedure of Example 1 was repeated, except that the pellets obtained in Examples 2, 8, and 9 and Controls 1, 3, and 5 were used instead, and a cooling time of molding cycle was varied to determine a minimum cooling time of each pellet. The term "minimum cooling time" as used in these Examples and Controls means a critical time that the continuous and steady operation of injection molding can be attained. The results were as shown in Table 3.

TABLE 3

| | lubricant (% by weight) | | | EA amount in pellet (% by weight) | minimum cooling time (sec) |
|---|---|---|---|---|---|
| | stearyl alcohol | stearic acid monoglyceride | paraffin | | |
| Example 10 | 0.15 | 0.1 | 0.05 | 7.0 | 6.0 |
| Example 11 | 0.1 | 0.1 | 0.05 | 8.0 | 4.0 |
| Example 12 | 0.15 | 0.1 | 0.15 | 8.0 | 4.0 |
| Countrol 8 | 0.15 | 0.1 | 0 | 7.0 | 9.0 |
| Countrol 9 | 0 | 0.2 | 0.05 | 7.0 | 15.0 |
| Countrol 10 | 0 | 0.3 | 0 | 7.0 | 15.0 |

What is claimed is:

1. A methacrylic resin composition which comprises a methyl methacrylate copolymer, a higher alcohol having 12–18 carbon atoms (x), a monoglyceride Of a higher fatty acid having 16–22 carbon atoms (y), and a paraffin (z), providing the individual contents of x, y, and z are in the respective ranges of 0.05 to 0.2% by weight, 0.05 to 0.2% by weight, and 0.02 to 0.15% by weight and the total content of x, y, and z is in the range of 0.2 to 0.35% by weight.

2. A composition according to claim 1, wherein said methyl methacrylate copolymer contains 87 to 95% by weight of a methyl methacrylate unit and 13 to 5% by weight of a methyl acrylate unit or ethyl acrylate unit and said copolymer has a monomer content of not more than 2,500 ppm, a dimer content of not more than 2,000 ppm, and an acid content of not more than 30 ppm.

3. A composition according to claim 1, wherein said higher alcohol (x) is a higher alcohol having 12 to 18 carbon atoms, said monoglyceride of a higher fatty acid (y) is the monoglyceride of a higher fatty acid having 16 to 22 carbon atoms, and said paraffin (z) is a paraffin having a melting point in the range of 40° to 60° C.

4. A composition according to claim 1, wherein said higher alcohol (x) is stearyl alcohol, said monoglyceride of a fatty acid is a monoglyceride of stearic acid, and said paraffin (z) is a paraffin having a melting point in the range of 40° to 60° C. and having normal paraffin as a main component thereof.

* * * * *

UNITED STATES PATENT AND TRADEMARK OFFICE
CERTIFICATE OF CORRECTION

PATENT NO. : 5,510,408
DATED : April 23, 1996
INVENTOR(S) : Yoshio Fuchigami, Kouichi Warino, Shigeo Matsumaru, Yosokichi Kobayashi It is certified that error appears in the above-indentified patent and that said Letters Patent is hereby corrected as shown below:

Column 1, line 57: "delicatelly" should be
    -- delicately --.
Column 4, line 49: "steary" should be -- stearyl --.

Column 9, line 3: "280°" should read -- 260° --.

Column 10, line 4: "3.0·" should read -- 3.0 --.

Column 10, line 60: "Calcohol 80)," should read
    -- "Calcohol 80"), --.
Column 13, lines 21 & 22: "Examples 10 to 12 and
    Controls 8 to 10" should start a new paragraph.

UNITED STATES PATENT AND TRADEMARK OFFICE
CERTIFICATE OF CORRECTION

PATENT NO. : 5,510,408
DATED : April 23, 1996
INVENTOR(S) : Yoshio Fuchigami, Kouichi Warino, Shigeo Matsumaru, Yosokichi Kobayashi It is certified that error appears in the above-indentified patent and that said Letters Patent is hereby corrected as shown below:

Column 14, line 3: "Of" should read -- of --.

Signed and Sealed this

Seventeenth Day of September, 1996

Attest:

BRUCE LEHMAN

Attesting Officer

Commissioner of Patents and Trademarks